United States Patent [19]

Alderson

[11] 3,900,676
[45] Aug. 19, 1975

[54] ANTISTATIC FILAMENTS

[75] Inventor: Thomas Alderson, Wilmington, Del.

[73] Assignee: E. I. Du Pont de Nemours and Company, Wilmington, Del.

[22] Filed: Aug. 14, 1973

[21] Appl. No.: 388,137

Related U.S. Application Data

[63] Continuation-in-part of Ser. No. 752,724, Aug. 14, 1968, abandoned, which is a continuation-in-part of Ser. No. 668,951, Sept. 19, 1967, abandoned.

[52] U.S. Cl........ 428/372; 260/857 TW; 264/210 F
[51] Int. Cl. ........................ C08g 41/04; D02g 3/00
[58] Field of Search ................ 161/174; 260/857 TW, 260/857 PE, 857 PA, 857 R, DIG. 15, 260/DIG. 17, DIG. 19, DIG. 21, DIG. 23, 260/DIG. 32; 264/210 F

[56] References Cited
UNITED STATES PATENTS
2,378,977  6/1945  Brubaker..................... 260/857 TW
2,993,025  7/1961  Alsup et al.......................... 260/857

*Primary Examiner*—George F. Lesmes
*Assistant Examiner*—Lorraine T. Kendell

[57] ABSTRACT

A filament of a fiber-forming, synthetic, linear, condensation polyamide or polyester having durably antistatic properties is prepared by modifying the composition from which the filament is melt spun with from 2–15 percent by weight of an N-aklyl polycarbonamide. In the drawn filament, the modifier is present, as a separate phase, in the form of elongated, conductive particles having a length to diameter ratio of at least 10.

8 Claims, No Drawings

ANTISTATIC FILAMENTS

CROSS-REFERENCE TO RELATED APPLICATIONS

This is a continuation-in-part of copending application Ser. No. 752,724, filed Aug. 14, 1968, now abandoned which in turn, was a continuation-in-part of copending application Ser. No. 668,951, filed Sept. 19, 1967, now abandoned.

BACKGROUND OF THE INVENTION

This invention relates to synthetic filaments and more particularly to antistatic polycarbonamide filaments.

The desirability of reducing the electrostatic propensity of synthetic fibers in textile applications is well known. A recent approach to achieve this is the incorporation of an incompatible, hydrophilic, poly(alkylene ether) into the filaments as a separate phase, described for example by Magat and Sharkey in U.S. Pat. No. 3,475,898. Unfortunately, the poly(alkylene ethers) are highly subject to oxidative degradation induced by heat and light. This instability, if not avoided by appropriate protective measures, can result in poor performance of these filaments during processing and use, e.g., poor thermal of and light stability.

Plasticized mixtures of a polycarbonamide and an N-alkyl substituted polycarbonamide are described in U.S. Pat. No. 2,378,977. These mixtures are substantially homogeneous, the N-alkyl polycarbonamide is essentially nonextractable from the product with a differential solvent and fibers produced from this mixture give poor antistatic performance.

The present invention provides filaments with a unique structure and consequent useful antistatic properties.

SUMMARY OF THE INVENTION

The products of this invention are oriented, durably antistatic, filaments of a fiber-forming, synthetic, linear, condensation polyamide or polyester modified by the admixture therein of from about 2 to about 15% by weight of the filament of an N-alkyl substituted polycarbonamide in which the tertiary carbonamide groups are an integral part of the polymer molecule. The modifier has a molecular weight of at least about 800 to about 5000 and is dispersed throughout the filament substantially as a separate phase in the form of discrete elongated conductive particles aligned essentially parallel to the filament axis. These particles should have a ratio of their length, L, to average diameter, D, of at least about 100. The antistatic filament preferably has a nuclear magnetic resonance (NMR) peak ratio (as defined hereinafter) of at least 1.5 in the dry state at 25°C.

The term "durably" means that the filaments retain antistatic activity throughout normal textile processing and finishing treatments and extended end-use, including repeated cleaning and laundering treatments.

The term "antistatic" means that the filaments show a significant reduction in tendency to generate static electrical charges as a result of an increase in conductivity to a level substantially more than 25 times greater than the conductivity of unmodified filaments.

DETAILED DESCRIPTION OF THE INVENTION

Tertiary polycarbonamides having alkyl groups substituted on a substantial number of the nitrogen atoms are relatively good conductors of electricity as indicated by their bulk Log R values of about 10.5 and below. When these N-alkyl polycarbonamides are incorporated into fiber-forming polycarbonamides so as to provide homogeneous compositions, resulting products have increased conductivity with respect to the unmodified, fiber-forming polycarbonamide, but they are not sufficiently conductive to be considered antistatic. Applicant has found that when the N-alklyl polycarbonamides are admixed with fiber-forming polycarbonamides so as to lead to filaments with a two-phase system having the N-alkyl polycarbonamide phase present as particles having a substantial L/D ratio, there is a many-fold increase in the conductivity and the fibers have excellent antistatic properties. The conductivity of the two-phase filaments of the present invention is at least about 2.5 times as great as corresponding homogeneous fibers and commonly will be ten and more times as great.

Tertiary polycarbonamides having an alkyl substituent on the nitrogen atom of 1–18 carbon atoms are not highly compatible with secondary, fiber-forming polycarbonamides. Therefore, in order to produce a homogeneous composition of these components, the polymers must be in intimate contact at temperatures above their melting points for a long enough period to achieve sufficient polymer interaction for producing homogeneity. These so-called "plasticized" compositions are believed to be copolymers as a consequence of transamidation reactions and, accordingly, incapable of substantial separation by extraction. Thus in producing the filaments of the present invention, it is essential that overmixing not occur and that the time the mixtures are maintained at elevated temperatures be minimized.

The compatibility of the N-alkyl polycarbonamides in the fiber-forming polycarbonamides is greatest when the alkyl group is a methyl group, accordingly it is preferred that the alkyl group have 2 to 18 carbon atoms.

To further decrease compatibility, the N-alkyl polycarbonamides are end-capped, or viscosity stabilized, with a monofunctional amide-forming compound having a long hydrocarbon chain, for example, stearic acid and stearyl and distearyl amines. Because of the increased ease with which two-phase compositions can be prepared from such compounds, stabilizedd N-alkyl polycarbonamides are preferred.

In preparing the products of the present invention, the N-alkyl polycarbonamide may be mixed directly with the fiber-forming polycarbonamide and preferably immediately spun into filaments. They may be combined as polymer flake and then spun into filaments. Some of the less compatible N-alkyl polycarbonamides can be introduced into the autoclave during production of the fiber-forming polycarbonamide, preferably late in the autoclave cycle. Preferably, the N-alkyl polycarbonamide and fiber-forming polycarbonamide are mixed in molten condition and immediately spun into filaments. The blended, molten polymers are spun to form filaments and drawn in the usual way.

Prior to spinning, the N-alkyl polycarbonamide is present in the molten, fiber-forming polycarbonamide as more-or-less spherical droplets and as the composition passes through the spinneret capillary and is formed into filaments the droplets are attenuated and become rod-like particles and subsequently appear as striations in the filaments. If the concentration of these particles is too great, difficulty will be encountered in attempting to form filaments because of dilution of the fiber-forming constituent. Accordingly, it is preferred that the concentration of the N-alkyl polycarbonamide not exceed about 15% by weight, based on the weight of the composition.

The N-alkyl polycarbonamides contain tertiary amide groups as an integral part of the polymer chain. They may be homopolymers or copolymers from N-alkyl and N,N'-dialkyl-substituted diamines or N-alkyl amino-carboxylic acids. The copolymers may contain minor amounts of corresponding unsubstituted amines. At least 35%, preferably 50%, of the polymer-chain amide linkages should be N-substituted with an alkyl group. Suitable alkyl groups are those containing from 1 to 18, preferably 2 to 18, more preferably 2 to 10 carbon atoms, or cycloalkyl groups containing 3 to 8 carbon atoms. Alkyl groups of 2 to 4 carbon atoms are especially preferred. Normally, the N-alkyl polycarbonamide copolymer should contain no more than about 15 mole percent of amide groups from a nonsubstituted, diprimary diamine. Higher concentrations of such diamines tend to reduce to an unsatisfactory degree the antistatic effectiveness of the polymer. Suitable N-substituted diamines are the N-mono- and N,N'-disubstituted diamines containing from about 2 to 18 and preferably, 2 to 12 carbon atoms in the alkylene group. Suitable aliphatic dicarboxylic acids are those containing from about 1 to 18, preferably, 4 to 12 carbon atoms in the alkylene group.

Some suitable N-alkylated diamines for use in the preparation of the N-alkyl polycarbonamides are N,N'-diethyl-, -diisobutyl-, di-n-butyl-, -dihexyl-, -diheptyl-, -didecyl- and -distearyl- ethylene, propylene, tetramethylene, hexamethylene, nonamethylene and decamethylene diamines as well as N,N'-dialkyl-bis(4-aminocyclohexyl) methanes and the mono-N-alkyl derivatives of these diamines.

Some suitable dicarboxylic acids for use in the preparation of the N-alkyl polycarbonamides are succinic, glutaric, adipic, pimelic, suberic, azelaic, sebacic, dodecanedioic and higher dicarboxylic acids and also such acids as N-N'-bis (ω-carboxyalkyl) piperazine.

Some suitable N-alkyl amino-carboxylic acids, or their amide-forming derivatives, which can be used to prepare suitable N-alkyl polycarbonamides for this invention are N-methyl-, -ethyl-, -isobutyl-, -n-butyl-, -hexyl-, -decyl-, etc., β-aminopropionic, ε-aminocaproic, 11-aminostearic and ω-amino-stearic acids.

Some suitable N-alkyl polycarbonamides are those prepared using N,N'-diethyl-hexamethylene, N,N'-diisobutylhexamethylene or N,N'-di-n-butyl-hexamethylene diamine and adipic, azelaic or dodecanedioic acid.

The N-alkyl polycarbonamides may contain other substituents, functional groups, copolymeric linkages or end-groups than those mentioned herein provided such modifications do not interfere with the required properties thereof as specified.

The N-alkyl polycarbonamides (N-alkyl antistats) have a molecular weight as determined by vapor pressure osmometry of from about 800 to 10,000, corresponding to an inherent viscosity in meta-cresol of from 0.06 to 0.7. Molecular weights less than about 800 result in poor durability of antistatic protection. All of the N-alkyl polycarbonamides exemplified herein as modifiers have a molecular weight of more than 800 and less than 5000 which values, accordingly, are referred to herein as preferred upper and lower limits.

The molecular weight of the modifier is regulated to the desired degree by polymerization conditions and by the use of viscosity stabilizers. Particularly suitable stabilizers are monofunctional carboxylic acids containing from 2 to 26 carbon atoms and monofunctional primary and secondary amines containing alkyl groups with from 1 to 18 carbon atoms. Up to 60 mole percent of the viscosity stabilizer may be used. In addition to previously mentioned viscosity stabilizers, other suitable stabilizers are acetic, propionic, butyric, valeric, pivalic, enanthic, pelargonic, decanoic, myristic, palmitic, benzoic, cyclohexane, carboxylic, and methane sulfonic (stabilizes by salt formation) acids and so forth. Preferably the N-alkyl polycarbonamide will be viscosity stabilized such that it contains less than 200 preferably less than 70 microequivalents of acid end-groups per gram of polymer. It is also preferred that they contain less than about 200 microequivalents per gram of polymer of amine end-groups.

Fiber-forming polymers useful for the filaments of this invention are synthetic, linear, fiber-forming polymers which can be melt spun into filaments. Preferably the melt-spinnable polymer is a polyester such as poly(ethylene terephthlate) or a polyamide, e.g. poly(hexamethylene adipamide). The polycarbonamides characterized by recurring carbonamide linkages as an integral part of the polymer chain are particularly preferred.

Suitable polycarbonamides are those melt-spinnable, synthetic, linear polycarbonamides which can be prepared from polymerizable monoamino-monocarboxylic acids, or their amide-forming derivatives, or from suitable diamines and suitable dicarboxylic acids, or their amide-forming derivatives. Typical of such polycarbonamides are poly(hexamethylene adipamide), polycaproamide and poly(undecanoamide). Other suitable polycarbonamides are poly(octamethylene oxalamide), and those containing divalent aromatic or cycloaliphatic radicals such as poly(2-methylhexamethylene terephthalamide) and the polyamides from bis(4-aminocyclohexyl) methane and aliphatic dicarboxylic acids containing 6 to 10 carbon atoms (e.g., sebacic acid). Still another class includes the polycarbonamides prepared from piperazine such as from piperazine and adipic acid and the like. Melt-spinnable, fiber-forming copolyamides and polyamide mixtures may also be used.

The N-alkyl polycarbonamide particles are usually closely and relatively uniformly spaced in the filament cross-section. These elongated particles usually overlap adjacent particles longitudinally along the filament.

To provide this two-phase structure, the N-alkyl polycarbonamide must be substantially insoluble in the fiber-forming polymer or at least be sufficiently incompatible that it can be effectively dispersed in the molten fiber-forming polymer and spun into filaments before a substantial portion of it has become compatible therewith. Consequently, the less compatible, higher hydrocarbon-content, N-alkyl polycarbonamides are generally preferred.

When the polymers are melt-blended, a mixing step is essential in order to effectively distribute the N-alkyl antistat. Melting the components in a screw extruder is usually satisfactory, although mechanical mixers are more effective due to the higher melt viscosities of the fiber-forming polymers. Excessive mixing must be avoided since this may reduce the size of the N-alkyl antistat particles so that they no longer provide antistatic effectiveness. Preferably the droplet size should remain relatively large prior to spinning, but not so large as to interfere with the spinning and drawing operations. The larger droplets can then become more highly attenuated during the spinning and drawing operations without breaking up into smaller particles, resulting in the final filament containing the desired, highly elongated particles of the antistat. Therefore, once the N-alkyl antistat has become effectively dispersed, additional excessive shear and high shear rates subsequently occurring during mixing, and passage through the transfer line and filter packs, normally employed in spinning and in the spinneret, should be avoided.

Obviously, the time during which the N-alkyl antistat and the molten fiber-forming polymer are permitted to remain in contact prior to spinning must be carefully controlled. Generally the time should be as short as possible consistent with efficient, uniform mixing of the two polymers. This is particularly true where there is possibility for chemical interaction or polymer interchange between the N-alkyl antistat and the fiber-forming polymers as is the case where the fiber-forming polymer is a polycarbonamide. Permissible contact time will depend upon the reactivities of the polymers and their compatibility, but normally should be less than about 60 minutes, preferably less than 30 minutes. Of course, there is less chance for such chemical interaction with the less compatible antistats, since such interaction is limited to the interfacial region between the two polymer phases. Chemical interaction between the polymers not only will reduce the effectiveness of the antistat but also can result in a loss of desirable physical properties of the fiber-forming polymer.

As a guide in obtaining the proper dispersion of the N-alkyl antistat in the fiber-forming polymer, the melt blend of the antistat and the fiber-forming polymer should be mixed sufficiently to provide approximately spherical N-alkyl antistat droplets of from about 1 to about 20 microns in diameter, or e.g., the droplets may be elliptical or cylindrical of about the same volume. Droplets of less than about 1 micron in diameter do not effectively contribute to durable antistatic performance and droplets greater than 20 microns in diameter usually cause difficulties in spinning filaments of normal textile denier, such as three to fifty denier per filament. The droplet size of the N-alkyl antistat can be measured microscopically on polymer samples taken from the spinning pump outlet prior to entering the filter pack.

When it is desired to use N-alkyl antistats of relatively low molecular weight, it may be convenient to add a thickening agent to the N-alkyl antistat to increase its melt viscosity, thus facilitating the dispersion and spinning with the much more viscous melt of the fiber-forming polymer.

In addition to being present as a separate phase, a major portion of the N-alkyl antistat must be present in the filament as highly elongated, rod-like particles, having a length to diameter ratio greater than about 100, in overlapping relationship along the length of the filament. Preferably the particles appear continuous in length. The particles are readily discernible as striations upon microscopic examination of the filament.

It is essential that a substantial portion of the N-alkyl antistat remains capable of being extracted from the spun and drawn filaments by an agent which is a solvent for the N-alkyl antistat but a nonsolvent for the filament. For example, extraction of poly(hexamethyleneadipamide) filaments with boiling isopropyl alcohol for 2 hours should remove at least 40% of the N-alkyl antistat present. Preferably from about 1.5 to 11% (on weight of fiber) of N-alkyl antistat can be thus extracted. If the N-alkyl antistat is mixed with the fiber-forming polymer to such an extent that it becomes substantially nonextractable in such a manner, the filaments are not antistatic.

Some of the lower N-alkyl polycarbonamides of succinic and lower diacids are somewhat water soluble and may be extracted during normal aqueous scouring treatments to produce voids in the filaments. For example, poly (N,N'-dimethyl-hexamethylene succinamide) viscosity stabilized with 17 mole percent of acetic acid is water extractable when used as described herein. Water extractability can be regulated by molecular weight, carbon content and mixtures of water soluble and water-insoluble N-alkyl polycarbonamides.

The N-alkyl polycarbonamides of acids higher than succinic acid are only slightly, if at all, soluble in water. Therefore, normal aqueous scouring does not result significantly in their extraction and the creation of voids in the filaments. Extraction and creation of such voids, if desired, can be accomplished with organic solvents for the N-alkyl antistat such as ethyl, isopropyl, butyl, hexyl, decyl, benzyl, etc. alcohols. Water-alcohol mixtures may also be used where only partial extraction is desired. This process can be used to alter aesthetics of the filaments since creation of the voids makes the filaments more opaque, thus increasing covering power; yet the filaments retain their original surface luster.

The effective N-alkyl polycarbonamides are generally liquids at 25°C., or very low melting amorphous solids. They have a conductivity such that their bulk Log R in the dry state is less than about 10.5. Bulk Log R, as used herein, is measured at room temperature on the dry N-alkyl polycarbonamide using a cell consisting of a 16 inch (40.64 cm.) glass tube (9 mm. outside diameter, 3 mm. inside diameter) filled with the polymer. An electrode is inserted at each end and the two are spaced 13 inches (33.02 cm.) apart (tip to tip). The current transmitted through the sample at a potential difference of 220 volts is recorded with a Beckman Vibrating Reed Microammeter (Model 1051). Conductivity is converted to resistivity by the equation:

$$R_s \text{ (ohms)} = \frac{Kc}{I \text{ (Amperes)}}$$

Kc, the cell constant, is determined using a liquid of known conductivity. The value of Kc used to calculate the values reported herein is $13 \times 10^{-2}$. $R_s$ is then converted to its $\text{Log}_{10}$ value (Log R).

The antistatic filaments of this invention are further characterized by an NMR peak ratio at 25°C. of at least about 1.0 unit above that of the unmodified filament, or for polycarbonamides normally about 1.5 or greater. This NMR peak ratio is determined from the NMR broadline spectrum measured at 25°C. on the dry filament (e.g. dried at 125°C. for 15 min. in dry nitrogen) in an atmosphere of dry nitrogen with a radio frequency of 56.4 megacycles at an attenuation setting of 17 decibels with a sweep modulation amplitude of one gauss. The NMR spectrum is measured using the nuclear magnetic resonance equipment of Varian Associates, Model V-4302 Dual Purpose Spectrometer and their high temperature probe insert, Model No. V-4331 TWL. The NMR spectrogram at a given temperature shows a broad absorption "hump" upon which is superimposed a very narrow peak. The derivative curve of the spectrogram is recorded by the spectrometer; "peak ratio" measurements are made on this curve. The height of the narrow peak divided by the height of the hump gives the peak ratio, as described in *J. Polymer Science* Part C, Polymer Symposia, No. 3, pp. 3–8 (1963). The precision of this peak ratio determination as used herein is about ± 0.2

This peak ratio is related to the relative amount of fluidlike mobility present in the polymer system which in turn is believed to be a factor in the ability of the system to transfer an electrical charge. The onset of this fluidlike mobility appears at a certain temperature below which the peak ratio is quite low (<1.0) and essentially constant with changes in temperature. Above this onset or transition temperature, herein called Tg (NMR), there is a rapid increase of peak ratio with a temperature increase. Therefore, for the filament to have a peak ratio at 25°C. of 1.5, it must have a Tg (NMR) of less than 25°C., and preferably less than about 10°C. This antistatic filament Tg (NMR) depends on the Tg (NMR) of the bulk N-alkyl polycarbonamide antistat present which, as has been found, must be less than 10°C., and preferably less than about 0°C. to be a satisfactory antistat.

Furthermore, the peak ratio at 25°C. for the filaments of this invention has been found to be related to the extractability of the antistat therefrom. At a given concentration, as the extractability of the antistat decreases, due to dissolution and interaction, filament plasticity increases, filament Tg (NMR) increases and the peak ratio at 25°C decreases until it approaches that of the unmodified filament and the filament is no longer antistatic.

Measurement of the length and diameter of the antistatic particles in the filaments can be accomplished through use of a light microscope capable of 3,000×magnification and a resolution of 0.25 micron. This requires the usual technique of oil immersion lens and condenser, short wave-length, monocromatic light (4,360 A is used) and coherent illumination.

The length of the particles is most easily measured using photomicropraphs taken perpendicular to the fiber axis at known magnification. However, this technique is difficult to apply at high antistat concentrations and with thick filaments, hence in this case particle length must be deduced from transverse sections.

Yarn cross-sections 8 microns thick are used in measuring the length and diameter of these particles. Diameter is measured directly from a photograph of the filament cross-section at known magnification. For better contrast, extraction of most of the antistat with a solvent prior to examination may be helpful.

The static propensity of fabrics reported herein is given in terms of the direct current resistance in ohms per square unit of area measured parallel to the fabric surface at a given temperature and 26% relative humidity according to the AAATC method, 76 - 59 ("Technical Manual of the AAATC", Volume 41, 1965, page B-118). This value, given as Log R is the logarithm to the base 10 of the fabric resistance in ohms. Higher values indicate reduced conductivity and a greater tendency to acquire and retain an electrostatic charge. Lower values indicate a greater conductivity which, as noted above, is more than 25 times that of an unmodified filament. For example, the fabric Log R of 6-6 nylon is 14.7 and the fabric Log R of 6-6 nylon modified according to the present invention is 13.3 or less.

The noted AAATC method provides an approximate measure of static propensity. The prior art (Magat and Sharkey, U.S. Pat. No. 3,475,898, column 8, lines 32–51) recognizes this and teaches the expression which relates fabric Log R to log rho and which takes into account differences in total yarn cross-section. The expression:

(Fabric) $\log R = \log rho + \log (9 \times 10^5 D) - \log (Pd)$ reduces to:

(Fabric) $\log R = \log rho + 6 - \log (Pd)$ for polyamide yarns having an average density, D, of 1.15. Fibers which produce a log rho value of 11 or less are considered to have acceptable antistatic properties with the lower values representing the more desirable antistatic properties.

Yarn Log R is measured in a similar manner to fabric Log R by placing 2300 filament wraps on a 2 inch × 6 inch (5.08 ×15.24 cm.) "Teflon" panel and clamping for testing in place of the fabric above.

In N-alkyl polycarbonamides, the N-substitution retards the rate of polyamidation. However, polymers can be prepared as known in the art using conventional polyamidation procedures with the appropriate reaction time, temperature and pressure. The amide-forming salts can be prepared by precipitation from alcoholic solutions of the reactants. The salt can be isolated by filtration under nitrogen and dried in a stream of pure nitrogen at room temperature and pressure or under vacuum at up to 100°C. Salt stoichiometry can be adjusted prior to polymerization to give the desired molecular weight and balance of polymer end-groups, considering also the use of a viscosity stabilizer as discussed herein. Small scale polymerizations in sealed tubes may be conducted e.g. by heating at 190°to 280°C. for 8 to 36 hours. The lower temperature and longer times are preferred when the monomers have a tendency to cyclize such as the cyclization of N,N'-diethyltetramethylene diamine to N-ethylpyrrolidine. In some cases the use of a somewhat stronger acid, such as succinic acid as compared to adipic acid, may assist in attaining higher molecular weight polymers.

The N-alkyl polycarbonamides may also be prepared by reaction of the diamine with an acid dichloride, by interfacial or solution polymerization techniques.

The following procedure and examples further illustrate the invention.

PROCEDURE A

This exemplifies polymerization procedures for the N-alkyl polycarbonamides useful in this invention.

The salt of N,N'-diethylhexamethylene diamine and dodecanedioic acid is prepared by precipitation from a solution of the reactants in isopropyl alcohol. The pH of the salt as measured on a solution of 1 g. of salt in 24 ml. of water is 9.60 at 25°C. An autoclave is charged with 2200 g. of the salt, 264.5 g. of 25% acetic acid, 52 g. of N,N'-diethylhexamethylene diamine, 3 g. Dow Antifoam A and 100 ml. of distilled water, and heated at 215°C. for 4 hours under 250–300 psi (2.1 kg./cm.²) pressure. The pressure is reduced to atmospheric and the temperature raised to 285°C. over a 75-minute period. The reactants are then held at 285°C. under atmospheric pressure under nitrogen for 1 hour and then at 285°C. for 2 hours at 2 to 10 mm. Hg. pressure. The atuoclave is cooled to about 100°C. and the polymer removed under a blanket of nitrogen. The polymer has a molecular weight of about 3,700, an inherent viscosity in m-cresol of 0.3, and analyses show 109.8 carboxyl and 75.5 amine end-groups in microequivalents per gram of polymer (equivalents per $10^6$ g. of polymer), and has a bulk Log R of 7.62.

In another polymerization, an autoclave is charged with 1930 g. (4.80 moles) of a salt of N-monoisobutyl-hexamethylenediamine and dodecanedioic acid, 341 g. ε-caprolactam (3.02 moles) and 410 g. stearic acid (1.44 moles) 34.5 g. dodecanedioic acid, 300 ml. distilled water, 2 g. Dow Antifoam A. The reactants are heated at 215°C. for 4 hours under autogenous pressure. The pressure is reduced to atmospheric and the temperature raised to 285°C. in 90 min. The reactants are held at these conditions under nitrogen for 3 hours and then heated at 285°C. under 2–10 mm. Hg. pressure for 1½ hours. The reactor is cooled to 100°–140° and the product extruded under nitrogen pressure. This polymer has an inherent viscosity of 0.21, a calculated molecular weight of about 2400, 163.2 amine and 137.3 carboxyl end-groups in microequivalents per gram of polymer, a Tg (NMR) of about +8°C. and a bulk Log R of 8.67.

end-group analysis of 212.6 amine and 47 carboxyl groups, a calculated molecular weight of about 2400, an inherent viscosity of 0.21 and a bulk Log R 8.42; (C) polymer from N,N'-diisobutylhexamethylene diamine and adipic acid, viscosity stabilized with 10 mole % acetic acid, having a melting point less than 23°C., 165 amine and 267 carboxyl end-groups, a calculated molecular weight of about 3000, inherent viscosity of 0.24 and bulk Log R 10.35; and (D) polymer from N,N'-diisobutylhexamethylene diamine and adipic acid, copolymerized with 45.5 mole % of 12-amino stearic acid and viscosity stabilized with 16.7 mole % acetic acid having a melting point less than 23°C., 81.4 amine and 149 carboxyl end-groups, a calculated molecular weight of about 2900, inherent viscosity 0.26 and a bulk Log R 10.41.

The N-alkyl polycarbonamide is blended with the molten poly(hexamethylene adipamide) in a test tube by stirring at 283°C. for about 20 minutes and the polymer blend is quenched and cut into ⅛-inch flake. The flake is melt-spun into 10-filament yarn using an experimental screw-melter spinning machine (which further disperses the melt before spinning) with spinneret orifices of 15 mils (0.381 mm.) diameter. The filaments are drawn in a conventional manner to give antistatic fibers containing dispersed, elongated particles of the minor component having a length to diameter rotio of greater than 20.

TABLE 1

| Additive | % Antistat Added | ABO* Yarn Denier | Tenacity gpd. | Elong. % | Mod., gpd. | Fabric Log R S-T-T** | Fabric Log R +9 "C"*** | log rho S-T-T | log rho +9"C" |
|---|---|---|---|---|---|---|---|---|---|
| A | 7 | 83 | 2.7 | 58 | 15 | 12.9 | 13.3 | 10.5 | 10.9 |
| B | 7 | 85 | 2.8 | 67 | 12 | 13.0 | 13.4 | 10.6 | 11.0 |
| C | 7.5 | 80 | 2.7 | 49 | 16 | 13.2 | 13.4 | 10.8 | 11.0 |
| D | 7.5 | 76 | 3.0 | 65 | 16 | 13.3 | 13.3 | 10.9 | 10.9 |
| E | None | 87 | 3.1 | 65 | 11 | 14.7 | >15.5 | 12.3 | >13.1 |

*After boil-off.
**See scour and bleach procedures in Ex. 3.
***Additionally given 9 "home" wash-dry cycles in a tumble washing machine with a synthetic detergent in water at 38°C., spun-dried, and tumble-dried at 77°C., coded "C" washes.

Fabric antistatic performance is determined by weaving the 10-filament yarns into 3×1 twill fabrics as the fill, using unmodified poly(hexamethylene adipamide) yarns as the warp.

EXAMPLE 1

Antistatic filaments of poly(hexamethylene adipamide), from flake having a relative viscosity in an 8.4% by weight solution in 90% formic acid of about 41, are melt-spun and drawn from blends with the following N-alkyl polycarbonamides: (A) polymer of N,N'-diethylhexamethylene diamine and dodecanedioic acid prepared with a 13.5 mole % excess of diamine and 15 mole % of stearic acid as viscosity stabilizer, having a melting point less than 23°C., a calculated molecular weight of about 2100, and an inherent viscosity of 0.24, endgroup analysis in microequivalents per gram of polymer of 464.3 amine and 69.8 carboxyl groups and a bulk Log R of 8.38;

(B) polymer of N,N'-diethylhexamethylene diamine and dodecanedioic acid and copolymerized in a 60/40 mole ratio with ε-aminocaproic acid and viscosity stabilized with 10 mole % excess diamine and 15 mole % stearic acid, having a melting point less than 23°C., an

EXAMPLE 2

Antistatic filaments from poly(hexamethylene adipamide) (relative viscosity of 41) are prepared by blending the following N-alkyl polycarbonamides, each at two different concentrations: (A) polymer of N,N'-diethylhexamethylene diamine and dodecanedioic acid viscosity stabilized with 3 mole % excess diamine and 14.7 mole % stearic acid having a calculated molecular weight of about 2600, an inherent viscosity of 0.28, 128 amine and 225 carboxyl end-groups and a bulk Log R 7.82; and (B) polymer of N,N'-diethylhexamethylene diamine and adipic acid viscosity stabilized with 13 mole % stearic acid having a molecular weight of about 2100, an inherent viscosity of 0.23, 271 amine and 225 carboxyl end-groups, and a bulk Log R 7.86. In order to decrease mixing time and contact time between the polymer in a molten condition, a screw-melter-extruder is used equipped with an injection port for introducing the antistat and mixing before the melt-spinning operation. Ten filament yarns are spun and drawn 3.5× using the same spinneret orifices as in Example 1 except Item 3 which is spun with a spinneret having orifices 9 mils in diameter. Filament properties, and the degree and durability of antistatic protection of a test fabric made therefrom are shown in Table 2.

TABLE 2

| Item | Additive | % | Yarn Denier | Tenacity gpd. | S-T-T, 55% R.H. | Fabric Log R S-T-T, 26% R.H. | +12 "C", 26% R.H. | S-T-T, 55% R.H. | log rho S-T-T, 26% R.H. | +12 "C" 26% R.H. |
|---|---|---|---|---|---|---|---|---|---|---|
| 1 | A | 4.2 | 90 | 3.0 | 11.9 | 13.1 | 13.4 | 9.5 | 10.7 | 11.0 |
| 2 | A | 8.3 | 86 | 2.8 | 11.1 | 12.2 | 12.4 | 8.7 | 9.8 | 10.0 |
| 3 | B | 5 | 85 | 2.8 | 12.8 | 13.7 | 14.2 | 10.4 | 11.3 | 11.8 |
| 4 | B | 8.3 | 88 | 3.0 | 11.8 | 13.0 | 13.1 | 9.4 | 10.6 | 10.7 |
| 5 | None | 0 | 87 | 3.1 | 14.1 | 14.7 | >15.5 | 11.7 | 12.3 | >13.1 |

Fabrics are prepared as in Example 1. Their static propensity is tested after a scour, "Textone" bleach and a "Tide" scour (S-T-T) and then again after 12 additional C home laundry cycles as in Example 3. After 50 such C washes, Item 1 retained a Log R of 13.3 and a log rho of 10.9 and Item 2 retained a Log R of 12.9 and a log rho of 10.5, the measurements being made at 26% RH.

In a test of filament light stability, after 300 hours in a "Xenotest" apparatus, Item 2 showed a 22.6% loss in tenacity and Item 5, the unmodified poly(hexamethylene adipamide) control, showed a 22.0% loss. Thus, any effect of the antistat on filament light stability is negligible.

Thermal stability tests at 180°C. likewise show no significant decrease in physical properties of filaments containing the antistats versus the unmodified filaments.

EXAMPLE 3

Filaments are metl-spun in a conventional manner with addition of the antistat as described below using a 41 RV supply flake of poly(hexamethylene adipamide). Extractability is determined as percent filament weight loss after extraction for three hours with refluxing isopropyl alcohol. Fabric Log R is measured on a filling face satin fabric with unmodified yarns as the warp, after S-T-T scouring and bleaching as follows:

1. Scour 30 minutes at 100°C. in a 50/1 weight ratio of bath to fabric using a stock solution of 7.2 g. of "Duponol" ME, a commercial textile surfactant made by E. I. du Pont de Nemours and Company, and 7.2 g. of trisodium phosphate in 18 liters of water; rinse thoroughly in water.

2. Bleach in 1.5 g. "Textone" a sodium chlorite bleaching agent produced by Olon Mathieson Chemical Corporation, and 5.0 g. sodium nitrate per liter of water, bring bath to a boil, add 3.0 g. of oxalic acid, add fabric and boil for 30 minutes; rinse in cold water. Add 2.5 g. of sodium bisulfite per liter of water, heat to 45°–60°C., add fabric, hold for 15 minutes, then rinse in cold water.

3. Boil in 1 g. of "Tide" a synthetic laundry detergent produced by Proctor and Gamble Distributing Company, per liter of water for 30 minutes, rinse in cold water, then boil in distilled water for 30 minutes.

A. Melt Injection of Antistat

Filaments are melt-spun using an experimental spinning machine equipped with a polymer screw-melter-extruder having injection means for introducing the antistat, including means for mechanically mixing the blended polymers prior to spinning. A conventional spinneret pack is used with 20–80 mesh sand at least 50% of which is greater than 40 mesh and spinneret orifices 25 mils (0.635 mm.) in diameter. The injected antistat is a polymer of N,N'-diethylhexamethylene diamine and dodecanedioic acid stabilized with 30 mole percent of stearic acid and having a molecular weight of 1800, inherent viscosity 0.17, 128.1 carboxyl and 22.7 amine end groups. Injection rate of the antistat is controlled to introduce 8% by weight of the filaments. Filaments are spun with a contact time of the blended polymers under molten conditions prior to spinning of eight minutes (Item 1). After spinning, the filaments are drawn 4.0× using a 90° hot plate and a 120°C. hot shoe.

In a similar manner filaments are spun and drawn using a N-alkylpolycarbonamide of the same composition which has not been stabilized with stearic acid; it has a molecular weight of about 4900, inherent viscosity 0.38, 713.8 carboxyl, and 26 amine end-groups. Filaments are prepared injecting 12% of the additive with an 8-min. contact time (Item 2), 12% additive with a 24-min. contact time (Item 3), and 6% additive with a 24-min. contact time (Item 4).

B. Results

The extractability of the antistat with isopropyl alcohol, as previously described, and fabric Log R for the above filaments are summarized in the following table.

| Item | % Added | % Extracted A* | % Extracted B** | Blend Time, Min., | Fabric Log R After S-T-T |
|---|---|---|---|---|---|
| 1 | 8a | 7.6 | 95 | 8 | 11.3 |
| 2 | 12b | 11.6 | 97 | 8 | 11.8 |
| 3 | 12b | 11.9 | 99 | 24 | 11.7 |
| 4 | 6b | 5.5 | 92 | 24 | 12.4 | a=poly(N,N'-diethylhexamethylene dodecanediamine)/30 mole percent stearic acid.
b=poly(N,N'-diethylhexamethylene dodecanediamide).
*based on fiber weight.
**based on amount of antistat added.

Improved effectiveness with viscosity stabilized additives is shown by comparing stabilized Item 1 with the same polymer but unstabilized in Items 2–4. Item 1 shows better static protection than Item 2 with an 8 minute contact time even though the latter contained more additive.

EXAMPLE 4

Filaments are prepared by the injection procedure and drawn as in Example 3 A. Eight percent of a polycarbonamide of N,N'-diethylhexamethylene diamine and dodecanedioic acid stabilized with 17 mole percent of acetic acid and having a molecular weight of 4500, inherent viscosity 0.35, 122.7 carboxyl and 61.9 amine end-groups and bulk Log R = 8.70 is injected, using a melt contact time in each case of less than about 12.3 minutes. The following effect on static performance in fabric after S-T-T is found.

| Orifice diameter, mils | Mixer, rpm. | Fabric Log R | % Extracted | |
|---|---|---|---|---|
| | | | A* | B** |
| 15 (0.381 mm.) | 40 | 12.2 | 4.8 | 60 |

*based on fiber weight.
**based on antistat added.

In a similar manner, filaments of poly(hexamethylene adipamide) are melt-spun injecting 8% of poly(N,N'-diethylhexamethylene dodecanediamide) which is not stabilized and having a calculated molecular wight of about 2000, an inherent viscosity of 0.14 and a bulk Log R 7.75. In each case the spinneret pack contains 3 mm. diameter glass beads supported on a 50-mesh screen with spinneret orifices and results as follows:

| Mixer, rpm. | Spinneret, dia., mils (mm.) | Yarn Log R |
|---|---|---|
| 15 | 9 (0.2286) | 12.8 |
| 15 | 15 (0.381) | 12.8 |
| 15 | 25 (0.635) | 12.5 |
| 12 | 38 (0.9652) | 12.2 |
| 20 | 50 (1.27) | 12.0 |

As shown, antistatic effectiveness can be greatly enhanced by the use of relatively low mixer speeds, low shear spinneret packs and larger spinneret orifices consistent with the teaching of this invention concerning the need of highly elongated antistat particles resulting from attenuation during spinning and drawing to give the best antistatic effect.

EXAMPLE 5

Filaments are melt spun using the injection procedure with a melt contact time less than 8 minutes. The antistat tested is (A) poly(N,N'-diethylhexamethylene dodecanediamide) stabilized with 30 mole percent of distearyl amine giving a molecular weight of about 1500, inherent viscosity 0.14, 116.3 carboxyl and 51.8 amine end-groups, and a bulk Log R of 9.00. Filaments are prepared by injecting 5% of the N-alkyl antistat into poly(hexamethylene adipamide) and compared with filaments prepared under similar conditions with no antistat. Results are as follows:

| Additive | % Injected | Rel. Viscosity | % Extractable | | Fabric Log R |
|---|---|---|---|---|---|
| | | | A* | B** | |
| None | 0 | 45.6 | 0.26 | — | 13.9 |
| A | 5 | 40.5 | 3.4 | 68 | 12.2 |

*based on fiber weight.
**based on antistat added.

By increasing the alkyl hydrocarbon content of the viscosity stabilizer, extractability and antistatic performance are increased and the degradative effect upon relative viscosity of the fiber-forming polymer is reduced.

EXAMPLE 6

This example demonstrates the effectiveness of the filaments of this invention in reducing static propensity of carpets.

An N-alkyl polycarbonamide is prepared by charging an autoclave with 2000 g. of a salt of N,N'-diethylhexamethylene diamine and dodecanedioic acid, 150 g. distilled water and 27 g. of "Uvitex" MN, an optical whitener produced by the Ciba Company. After an initial heating period under autogenous pressure at 240°C. the pressure is reduced to atmospheric while the temperature is increased from 240° to 280°C. The temperature is held at 280°C. for 90 minutes at atmospheric pressure. The polymer is then cooled to 150°–100°C. and discharged. It has an inherent viscosity of 0.31, a calculated molecular weight of about 4100, 327 carboxyl and 163 amine end-groups in microequivalents per gram of polymer, bulk Log R 8.4 and a Tg (NMR) of about −15°C.

Poly(hexamethylene adipamide) flake having a relative viscosity of 46.2 is dried 20 hours under vacuum prior to melt spinning. The relative viscosity increases during the drying and melt-spinning operations due to the drying and heating. Prior to spinning, 10% by weight of the above N-alkyl polycarbonamide is injected and blended using a first and second screw zones operating at 250° and 280°C. and all other temperatures at 290°C. A two-stage helical mixer was used at 12 rpm. A final spinning temperature of 290°C. is used. The spinneret pack consists of 3 mm. diameter glass beads supported on a 50-mesh screen. The spinneret contains 34 holes, 50 mils (1.27 mm.) in diameter. The filaments are spun and drawn in a conventional manner in a continuous operation using a 3.5× draw ratio. They have a Tg (NMR) of about −11°C. and a peak ratio of 2.6.

The yarns are two-plied, and bulked using a hot-air jet. Yarn denier after bulking is 1275 before boiling-off and 1284 after boil-off.

The yarn is two-plied again with one-half Z twist. A tufted carpet is prepared using as the backing a 12 ounce cotton duck with a pile height nine-sixteenths inch (1.43 cm.) and a three-sixteenths inch (0.476 cm.) gage with approximately 9 stitches per inch (3.54 per cm.) adjusted to give 26 ± 2 ounces per square yard (0.88 kg./meter$^2$). The carpet is 24 inches in width (61 cm.).

The carpet is scoured in a bath containing cold water having 0.01% trisodium phosphate and 0.01% "Duponol" RA, (a surfactant by the E. I. du Pont de Nemours & Company), in percent by weight based on bath volume. The temperature is raised at 3°F. per minute to boiling (1.66°C. per min.) and held at the boil for 30 minutes. The carpet is rinsed clear for 30 minutes, giving a boiling wash for 60 minutes, rinsed clear for 30 minutes with deionized water, a second boiling wash at 60 minutes, rinsed and air dried. The carpet back is latexed with "Vulcanol" 6676, manufactured by the Alco Chemical Corporation, applied at 16.2 oz, per linear yard (485 g./linear/meter) and air cured at room temperature.

Static propensity of the carpet is tested by measuring the electrostatic voltage built-up on a person walking upon a section of the carpet (Shuffle Test) at 70°F. (21°C.) and 20% relative humidity. The test shows a voltage build-up of about 3.0 kilovolts. A similar carpet with unmodified filaments of poly(hexamethylene adipamide) shows a voltage accumulation greater than 11.4 KV.

In a similar manner, a carpet is prepared from filaments of poly(hexamethylene adipamide) into which was injected prior to spinning 5.0% by weight of the same N-alkyl polycarbonamide but which was viscosity stabilized during polymerization with 30 mole percent of stearic acid. The injected polymer has an inherent viscosity of 0.17 and 126 carboxyl and 56 amine endgroups and a Tg (NMR) of about −15°C. The spinneret pack contains 20–80 mesh sand with 50% larger than 40 mesh supported on a 200-mesh screen. The spinneret orifices are 25 mils (0.635 mm.) in diameter. The filaments are spun and drawn 3.0×. They have a Tg (NMR) of about −14°C. and a peak ratio of 3.8. A carpet prepared and tested as described above gives a 5.0 kilovolt build-up in the Shuffle Test.

Microscopic examination of the filaments in both cases shows numerous extremely long striations as evidence of the separate antistat phase.

EXAMPLE 7

This example demonstrates the effectiveness of the antistatic filaments of this invention in apparel fabrics.

Item A

Filaments are melt spun from poly(hexamethylene adipamide) into which is injected prior to spinning 3.0% by weight of poly(N,N'-diethylhexamethylene dodecanediamide) which has been viscosity stabilized with 30 mole percent of stearic acid. The latter polymer has an inherent viscosity of 0.15, a calculated molecular weight of about 2,000, 89.6 amine and 119 carboxyl end-groups, and a bulk Log R of 8.37. Prior to spinning the molten polymers are mixed in a helical mixer which gives a hold-up time of 10.3 minutes in the mixer and 15.6 minutes total contact time between additive and substrate. The spinneret pack contains sand of 20–80 mesh having at least 50% greater than 40 mesh. The spinneret has 13 holes shaped for producing a trilobal cross-section. The orifices consist of three intersecting slots at equal angles, each slot 15 mils (0.38 mm.) in length from the center, 3 mils (0.076 mm.) in width and ahving a circular tip 5 mils (0.127 mm.) in diameter. Filament and fabric properties are shown below.

Item B

In a similar manner, filaments are spun injecting 5.3% of the same N-alkyl polycarbonamide except it is viscosity stabilized with only 22 mole percent of stearic acid. It has an inherent viscosity of 0.17, a calculated molecular weight of about 2400, 92.2 amine and 136.4 carboxyl endgroups, bulk Log R 8.50. Hold-up time during mixing prior to spinning is about 10 minutes as in Item A. The same spinneret is used except the sand pack contains finer sand consisting of a final layer 0.28 inch (7.11 mm.) thick of 150/200 mesh sand, above which is 0.17 inch (4.32 mm.) 80/100 mesh sand, preceded by sand 20–80 mesh with more than 50% larger than 40 mesh.

Filament and fabric properties are shown below.

| Item | % Additive Extractable* | Denier | Yarn Properties Tenacity, gpd. | Elong. % | Modulus gpd. |
| --- | --- | --- | --- | --- | --- |
| A | 63 | 52.2 | 3.12 | 50.3 | 13.3. |
| B | 71 | 44.7 | 4.00 | 37.9 | 13.6 |

*with refluxing isopropyl alcohol (3 hrs.), based on weight of antistat added.

| | Fabric Properties | Sail Test Declinging Times After 50 "C" Washes, Min. | |
| --- | --- | --- | --- |
| Item | Log R,* 26% R.H. | Primary | Secondary |
| A | 12.1 | 0.96 | 1.43 |
| B | 12.2 | 1.19 | 2.12 |

*after S-T-T scouring and bleaching

The Sail Test measures the severity and duration of garment clinging due to static under simulated use conditions. In this test, static is induced in a tricot half-slip, worn by a technician, by rubbing against a poly(ethylene terephthalate) sail fabric held between two vertical poles. The time taken for the half-slip to uncling (or decling) while the subject walks around the room maintained at 20% relative humidity is measured. Two types of declinging are measured. Primary declinging is the time in minutes required for the half-slip to lose its initial bunched-up appearance. At this time the slip is judged to be comfortable with most of the clinging gone. Secondary, or final clinging, is the time taken to reach a point where only very slight clinging remains over a small area, usually too slight to be felt by the subject. For this test, yarns are knit into a conventional tricot slip fabric, heat-set and scoured in a conventional fabric finishing procedure. The above results are reported after 50 C home laundry cycles, described previously, showing excellent durability of static protection. Under the same conditions, a tricot fabric of unmodified poly(hexamethylene adipamide) filaments gives a primary declinging time of about 10 minutes and a secondary declinging time of greater than 10 minutes.

EXAMPLE 8

This example demonstrates use of an N-alkyl polycarbonamide antistat in polyester filaments.

Antistatic filaments from poly(ethylene terephthalate) are prepared by injecting and mixing prior to spinning 3–4 weight percent (of the polyester) of a polymer of N,N'-diethylhexamethylene diamine and adipic acid stabilized with 28.6 mole percent acetic acid and 14.3 mole percent excess diamine. The polycarbonamide has an inherent viscosity of 0.21, a calculated molecular weight of about 1500, 333 amine and 22.4 carboxyl end-groups and a bulk Log R of 9.29. The molten antistat is injected just prior to spinning using a spinning apparatus of the type described in Example 2. Prior to injecting, the N-alkylated polycarbonamide is thoroughly dried to avoid unnecessary degradation of the polyester by hydrolysis from entrapped moisture. Seventeen filament yarns are spun and drawn in a conventional manner using a draw ratio of 4.1×. The yarns are woven into a filling-face fabric using warp yarns of unmodified poly(ethylene terephthalate) and evaluated for antistatic properties after scouring using the static decay method described below. Using an applied voltage of 5.0 kilovolts, the fabric attains a potential of 3.4 kilovolts at 25% relative humidity. Upon removal of the voltage and grounding, the static charge decays to half this level in 11 seconds and to a level of 500 volts in 152 seconds. A fabric of unmodified poly(ethylene terephthalate) yarns will not charge at all under these test conditions and if charged by friction, will not decay in 10 minutes.

The charge decay test for static propensity is described by V. Shashoua in *Jour. Poly. Sci.* 33, 65–85 (1958). In this test the fabric sample is given an electrostatic charge by placing ends of the fabric between clamps which are connected to a 5,000 volt direct current source. The potential charge at the center of the fabric is measured; it should reach a level of at least 2500 volts. The time in seconds for the charge to decay to 500 volts, or to one-half the original value (half-life) when the direct current charge is disconnected is proportional to the static propensity of the fabric (the faster the decay, the lower the static propensity of the fabric).

pared under these conditions but reflecting three slightly different levels of actual antistat found in the final yarn are summarized in Table 3.

TABLE 3

| Item | % Antistat Theoretical | % Antistat Found | Tenacity, gpd./ % Elong./Modulus | Filament Relative Viscosity | Fabric Log R* | Sail Test** Total Declinging Time, Min. | % Extractables*** A | % Extractables*** B | NMR Peak Ratio | log rho |
|---|---|---|---|---|---|---|---|---|---|---|
| A | 5.8 | 5.9 | 3.4/47.7/20.5 | 46.5 | 12.1 | 1.44 | 4.10 | 69 | 4.4 | 9.6 |
| B | 5.8 | 5.25 | — | 42.7 | 12.5 | 3.15 | 3.29 | 63 | 3.7 | 10.0 |
| C | 5.8 | 4.84 | 4.1/41.8/41.8 | 45.2 | 13.0 | — | 3.40 | 70 | 3.6 | 10.5 |

*Determined at 26% relative humidity on filling face satin fabric in which test yarn is used in filling, warp is conventional 66-nylon. Fabric is scoured and bleached (S-T-T) as described in Example 3.
**After 50 "C" washings and dryer dryings and 1 wash followed by drip drying.
***Weight loss after 3 hours in refluxing isopropyl alcohol corrected for weight loss of filaments without the antistat. "A" is based on yarn weight, "B" is based on antistat initially found in yarn.

EXAMPLE 9

This example describes the preparation of antistatic tricot yarn of poly(hexamethylene adipamide) by a coupled spin-draw process.

The spinning apparatus consists of a screw-melterextruder equipped with an injection system for the antistat followed by a polymer mixer equipped with a two-stage helical stirrer from which the polymer is fed into a transfer line in a conventional manner to the spinneret which is preceded by a sand pack. The conventional sand pack contains layers of sand increasing in fineness with the top layer containing 20–80 mesh sand with 50% larger than 40 mesh, followed by 60–80 mesh, 100–150 mesh and finally 150–200 mesh. The spinneret contains 10 holes for producing trilobal filaments, each hole consisting of 3 radially intersecting slots positioned at 120°., each slot being 4 mils (0.102 mm.) in width and 15 mils (0.381 mm.) in length. The filaments are spun in a conventional manner using a feed roll speed of 1200 ypm., first stage draw roll 3,000 ypm., a second stage draw roll heated at 140°C. with a speed of 3015 ypm. and a let-down roll speed of 3061 ypm. prior to windup at 2904 ypm.

The poly(hexamethylene adipamide) flake which is used has an initial relative viscosity of 44 and contains 1% titanium dioxide as a delusterant. The injected antistat is poly(N,N'-diethylhexamethylene dodecanediamide) stabilized with 17 mol percent stearic acid and prepared as described in procedure A. The antistat has a bulk Log R of 8.71, 128.5 carboxyl and 24.2 amine end-groups in microequivalents per gram of polymer, an inherent viscosity in meta-cresol of 0.23, a molecular weight as calculated from end-groups of 3240, a molecular weight determined by boiling point elevation in benzene of 2900 and a Tg (NMR) of −23°C.

The polymer is spun at a rate of about 10.23 grams per minute with the injection rate of the antistat being about 0.52 grams per minute. The residence time in the mixer is about 14–15 minutes and in the transfer line about 3–5 minutes. Yarn properties for three items prepared under these conditions but reflecting three slightly different levels of actual antistat found in the final yarn are summarized in Table 3.

Photomicrographs of the filaments show a decrease in the density of numerous, apparently continuous striations in the filaments in going from item A to C, which corresponds to the decrease in antistatic protection.

EXAMPLE 10

This example shows the preparation of antistatic filaments of this invention in a polymer of ε-amino caproic acid (6-nylon). Filaments are prepared from 6-nylon having a relative viscosity of 42 in a manner described previously using a screw-melter-extruder equipped with an injection system and a polymer mixer, injecting the antistat at a rate of about 5.95%. The antistat is poly(N,N'-diethyl hexamethylene dodecanediamide) stabilized with 17 mol percent stearic acid having a bulk Log R of 7.38, 133 carboxyl and 37.9 amine endgroups in microequivalents per gram of polymer, an inherent viscosity of 0.24 and a molecular weight as calculated from end-groups of 3160. The residence time in the mixer is about 7–9 minutes and in the transfer line about 3–5 minutes. The filaments are spun in a conventional manner using a feed roll speed of 330 ypm., drawn on a hot pin at 70°C. with a first stage draw roll of 660 ypm. followed by a hot pipe at 110–130°C. and a second stage draw roll speed of 980 ypm. The 6-nylon is spun at a rate of about 8.0 grams per minute with an antistat injection rate of about 0.5 grams per minute. The resulting filaments have a yarn denier of 98.5, a tenacity of 1.89 grams per denier, elongation at break of 69.7 and an initial modulus of 7.1 grams per denier. Fabric Log R determined at 26% relative humidity on a filling face satin fabric using the antistatic yarn as a filling with a warp of conventional 66-nylon is 12.4 and log rho is 10.0. Prior to the Log R measurement the fabric is given an S-T-T scour and bleach. The filaments have an NMR peak ratio of 5.0 and show a percent weight loss after three hours in refluxing isopropyl alcohol of 4.55. Control 6-nylon filaments under the same conditions give a fabric Log R of 14.7 and a log rho of 12.3, an NMR peak ratio of 1.4 and a percent weight loss after three hours in refluxing isopropyl alcohol of 1.02.

Photomicrographs of the antistatic filaments at a magnification of 500× show extremely numerous, apparently continuous striations of extremely fine diameter.

EXAMPLE 11

Antistatic filaments from poly(hexamethylene adipamide) having a relative viscosity of 41 are prepared by injection and blending of the following N-alkyl polycarbonamide at two different concentrations immediately prior to spinning; polymer of N,N'-diethylhexamethylene diamine and adipic acid viscosity stabilized with 23 mol percent stearic acid and having a relative viscosity of 4.02 (as measured on a 9.2 weight percent solution in 90% formic acid), a calculated molecular weight of 2000, 115 amine and 52 carboxyl end-groups and a bulk Log R of 10.2. The bulk Log R immediately after preparation was lower but rose to this level upon standing, presumably due to some crystallization of the polymer. For comparison, similar filaments are spun without injection of the antistat. In order to decrease mixing time and contact time between the polymers in the molten state prior to spinning, a screw-melter-extruder is used equipped with an injection port for introducing the antistatic polymer and mixing before the melt spinning operation. A yarn containing 10 filaments is spun and drawn to a draw ratio of 2.65X. The filaments are of a trilobal cross-section produced by spinneret orifices as described in Example 10. Filament properties and antistatic performance are shown in Table 4.

cles with a length to diameter ratio considerably greater than 10.

EXAMPLE 12

This example demonstrates the effectiveness of N-alkyl polycarbonamide antistats when incorporated into either the sheath or the core of filaments prepared by conventional sheath-core filament techniques.

The filaments are metl-spun from poly(hexamethylene adipamide) having a relative viscosity of 42 by blending a polymer of N,N'-diethylhexamethylene diamine and dodecanedioic acid into either the sheath or core polymer component. The N,N'-alkyl polymer is viscosity stabilized with 17 mol percent stearic acid and has an inherent viscosity of 0.24, a calculated molecular weight of about 3200, 133 carboxyl and 37 amine end-groups and a bulk Log R of 7.4. Filaments are spun on a spinning machine capable of producing sheath-core type filaments in a conventional manner. Six percent by weight antistat is injected into the polycarbonamide which goes into the sheath of the fiber, and no antistat is injected into the polycarbonamide which goes into the core of the fiber. The resulting fiber contains

TABLE 4

| Item | % Antistat Added | Yarn Denier | Tenacity (gpd) | NMR Peak Ratio | % Antistat Extracted | Fabric Log R, 26% R.H. (S-T-T)** | Sail Test Decling Time (min) (50 "C" Washes) |
|---|---|---|---|---|---|---|---|
| 1 | 3 | 33.8 | 3.7 | 2.3 | 44 | 12.4 | 4.0 |
| 2 | 6 | 29.0 | 3.6 | 3.3 | 48 | 12.5 | 6.1 |
| 3 | 0 | 30.6 | 4.5 | 0.4 | — | 14.7 | 10+ |

**
log rho
9.7
9.8
12.0

The percent antistat injected is based on the weight of the yarn and the percent antistat extracted is based on the weight of antistat added to the yarn. The extractability was determined by extracting the yarn in boiling isopropyl alcohol for three hours as previously described. The fabric for the Log R test is prepared by weaving the antistatic yarn into a 3×1 twill fabric as the fill, using unmodified poly(hexamethylene adipamide) yarns as the warp. Antistatic properties of the fabric are then measured in the direction of the fill. The sail test procedure is described in Example 7.

Microscopic examination of the antistatic filaments shows the antistat dispersed as highly elongated parti- 3% by weight of antistat based on the total weight of the fiber. In a similar manner filaments are prepared by injecting 6% of the antistatic polycarbonamide into the polymer which goes only into the core. Filament properties and antistatic performance are shown in Table 5.

TABLE 5

| Item | Antistat Where Placed | % of Fiber | NMR Peak Ratio | Fabric Log R, 26% R.H. | Sail Test Decling Time (Minutes) 50 "C" Washes | log rho |
|---|---|---|---|---|---|---|
| A | 6% Core | 3 | 2.8 | 11.9 | 1.2 | 9.3 |
| B | 6% Sheath | 3 | 2.3 | 12.3 | 2.4 | 9.7 |
| C | — | 0 | 0.4 | 14.7 | 10+ | 12.1 |

The data show that the antistatic additive is highly effective compared to unmodified filaments of poly(hexamethylene adipamide) when the antistat is present either just in the core or just the sheath of the filaments.

Microscopic examination of the antistatic filaments shows numerous highly elongated particles of the antistat in the sheath or core having a ratio of length to diameter considerably greater than 10.

The modified fiber-forming polymer of this invention may be used as filaments in any state of aggregation, e.g. plexifilament, fiber, staple, flock, yarn, tow, cord or fabric. It may form a component of a co-spun yarn in which filaments of two or more different compositions are spun simultaneously to make a mixed filament yarn or as a component of a side-by-side or a sheath-core yarn. The yarn bundle may also be separated and given different treatments wherein a differential shrinkage, bulkable yarn is produced.

The filaments of this invention may also contain conventional additives such as suitable light stabilizers, ultraviolet absorbers, delusterants, pigments or dyes. These additives may be added before, along with, or after the antistat itself. It is generally desirable to add conventional antioxidants. Some preferred antioxidants for fiber-forming polycarbonamides are sodium phenylphosphinate, phenolic antioxidants, and manganous hypophosphite, for example.

The filaments may be used, with or without a partial extraction step at any stage, to produce any type of fabric, whether tufted, knitted, felted or woven. The filaments may be used alone, or may be plied or blended with other natural, synthetic or man-made fibers. Good anti-soiling properties may be obtained when a partial extraction step is utilized to create voids in the filaments. The degree of antistat extraction to improve the anti-soiling properties must be balanced against the reduced antistatic protection from the extraction in order to retain filaments which exhibit an optimum combination of both qualities.

The filaments are especially useful in the pile of pile fabrics, such as velvet, plush, rugs, carpets and synthetic fur. Rugs and carpets of these fibers are especially useful due to their antistatic properties and attractive luster. Their antistatic behavior is often so effective that a minor portion serves to reduce to an acceptable level the static propensity of a textile article in which they are combined with unmodified hydrophobic filaments.

As many widely different embodiments of this invention may be made without departing from the spirit and scope therof, it is to be understood that this invention is not to be limited to the specific embodiments thereof except as defined in the appended claims.

Having thus described the invention, what is claimed as new and desired to be secured by Letters Patent is:

1. A synthetic filament of a fiber-forming, linear polymer selected from the group consisting of polyamides and polyesters having durably antistatic properties due to a content of from 2–15 percent by weight of the filament of an N-alkyl polycarbonamide modifier having a molecular weight of at least about 800 to about 5000 and a bulk Log R in the dry state of less than about 10.5, said modifier being dispersed throughout the filament as a separate phase in the form of conductive, microscopic, elongated particles aligned essentially parallel to the filament axis with a length to diameter ratio of at least about 100, and wherein each alkyl substituent of said polycarbonamide contains from 2 to 18 carbon atoms, at least 40 percent of said N-alkyl polycarbonamide being extractable from said filament on boiling with isopropyl alcohol for two hours, said filament being characterized by a conductivity substantially more than 25 times that of an unmodified filament of the same polymer.

2. The filament of claim 1, wherein each alkyl substituent contains 2–4 carbon atoms.

3. The filament of claim 1, wherein said modifier contains up to 60 mole percent of a monofunctional amideforming compound as a viscosity stabilizer.

4. The filament of claim 3, wherein at least 35 percent of the carbonamide linkages in said modifier are N-alkyl substituted and each N-alkyl substituent contains 2–4 carbon atoms.

5. The filament of claim 4, further chacterized by an NMR peak ratio of at least 1.5 at 25°C. in the dry state, said polymer being a polycarbonamide.

6. A drawn filament of a fiber-forming, linear polyamide, said filament having durably antistatic properties due to a content of from 2–15 percent by weight of the filament of an N-alkyl polycarbonamide modifier having a molecular weight of 800–5000, said modifier being dispersed as a separate phase in the form of conductive, microscopic, elongated particles with a length to diameter ratio of at least 100, each alkyl substituent of said polycarbonamide containing from 2–4 carbon atoms, said particles being characterized as to conductivity by a bulk Log R for the modifier in the dry stat of less than 10.5 and said filament being characterized by a conductivity substantially more than 25 times greater than the conductivity of an unmodified filament of said polyamide.

7. The filament of claim 6, said N-alkyl polycarbonamide being the reaction product of both difunctional and monofunctional amide-forming compounds, the latter being present as a chain-terminating viscosity stabilizer.

8. The filament of claim 7, said monofunctional amide-forming compound being from the group consisting of stearic and acetic acids.

* * * * *